US012631481B2

(12) United States Patent
Sukalski et al.

(10) Patent No.: US 12,631,481 B2
(45) Date of Patent: May 19, 2026

(54) SYSTEMS AND METHODS FOR A WEIGH BRIDGE CELL ADAPTER

(71) Applicant: Illinois Tool Works Inc., Glenview, IL (US)

(72) Inventors: Andrew James Sukalski, Fairmont, MN (US); Scott Ray Janssen, Fairmont, MN (US); Cory Hainy, Fairmont, MN (US)

(73) Assignee: Illinois Tool Works Inc., Glenview, IL (US)

( * ) Notice: Subject to any disclaimer, the term of this patent is extended or adjusted under 35 U.S.C. 154(b) by 340 days.

(21) Appl. No.: 18/391,944

(22) Filed: Dec. 21, 2023

(65) Prior Publication Data

US 2024/0210234 A1     Jun. 27, 2024

Related U.S. Application Data

(60) Provisional application No. 63/435,388, filed on Dec. 27, 2022.

(51) Int. Cl.
*G01G 19/02* (2006.01)

(52) U.S. Cl.
CPC .................................. *G01G 19/021* (2013.01)

(58) Field of Classification Search
CPC .................................................... G01G 19/021
USPC ......................................................... 177/133
See application file for complete search history.

(56) References Cited

U.S. PATENT DOCUMENTS

| | | | | |
|---|---|---|---|---|
| 6,397,657 | B1 * | 6/2002 | Kroll ..................... | G01L 25/003 |
| | | | | 73/11.05 |
| 7,009,118 | B2 * | 3/2006 | Pottebaum ............. | G01G 19/12 |
| | | | | 177/136 |
| 2016/0202111 | A1 * | 7/2016 | Fahey .................. | B65D 90/143 |
| | | | | 254/89 R |

FOREIGN PATENT DOCUMENTS

| | | | | |
|---|---|---|---|---|
| EP | 1045130 | 10/2000 | | |
| GB | 2534362 A | * 7/2016 | ............. | G01G 19/02 |

OTHER PUBLICATIONS

Int'l Search Report and Written Opinion Appln No. PCT/US2023/085618 mailed Apr. 12, 2024.

* cited by examiner

*Primary Examiner* — Jacques M Saint Surin
(74) *Attorney, Agent, or Firm* — McAndrews, Held & Malloy, Ltd.

(57) ABSTRACT

The present disclosure provides systems and methods for an adapter bar for a weigh bridge. The adapter bar includes an adapter extension that is configured to extend into one or more support plates comprising a structure of the weigh bridge. The adapter bar further includes an adjustable mount, which is configured to receive a load cell and adjust a vertical position or elevation of the weigh bridge relative to the load cell. The adjustable mount can include a threaded shaft that is connected to the adjustable mount, the threaded shaft being operable to adjust a vertical position of the weigh bridge relative to a baseplate secured to an underlying surface.

20 Claims, 11 Drawing Sheets

200

202 — Install adapter bar in support plates

204 — Arrange baseplate below adjustable mount

206 — Insert column tool into adjustable mount

208 — Secure baseplate to underlying surface

210 — Remove column tool

212 — Install load cell between adjustable mount and base plate

214 — Adjust adjustable mount to secure load cell

216 — Install locking devices

218 — Install spacers in base plate sidebars

SYSTEMS AND METHODS FOR A WEIGH BRIDGE CELL ADAPTER

CROSS REFERENCE TO RELATED APPLICATIONS

This application is a Non-Provisional Patent Application of U.S. Provisional Patent Application No. 63/435,388 entitled "Systems And Methods For A Weigh Bridge Cell Adapter" filed Dec. 27, 2022, which is herein incorporated by reference in its entirety.

BACKGROUND

Weigh bridges or truck scales are large structures capable of measuring a weight of a vehicle. Conventional weigh bridges are often configured to include four or more bending beam load cells, a shear beam load cells, or a weighbar at corners of the weigh bridge to measure the weight of the vehicle. Such load cells are often larger, heavier, may be more expensive, and/or may have limitations as to weight capacity and/or accuracy. However, replacing such a load cell with other types of load cells may not be possible due to the structure of the weigh bridge. Accordingly, there is a need for systems and methods to support alternative load cells in conventional weigh bridges.

SUMMARY

Disclosed are systems and methods for an adapter bar for a weigh bridge. The adapter bar includes an adapter extension that is configured to extend into one or more support plates comprising a structure of the weigh bridge. The adapter bar further includes an adjustable mount, which is configured to receive a load cell and adjust a vertical position or elevation of the weigh bridge relative to the load cell. The adjustable mount can include a threaded shaft that is connected to the adjustable mount, the threaded shaft being operable to adjust a vertical position of the weigh bridge relative to a baseplate secured to an underlying surface.

These and other features and advantages of the present invention will be apparent from the following detailed description, in conjunction with the appended claims.

BRIEF DESCRIPTION OF THE DRAWINGS

The benefits and advantages of the present invention will become more readily apparent to those of ordinary skill in the relevant art after reviewing the following detailed description and accompanying drawings, wherein.

The figures are not necessarily to scale. Where appropriate, similar or identical reference numbers are used to refer to similar or identical components.

DETAILED DESCRIPTION

Figure 1:
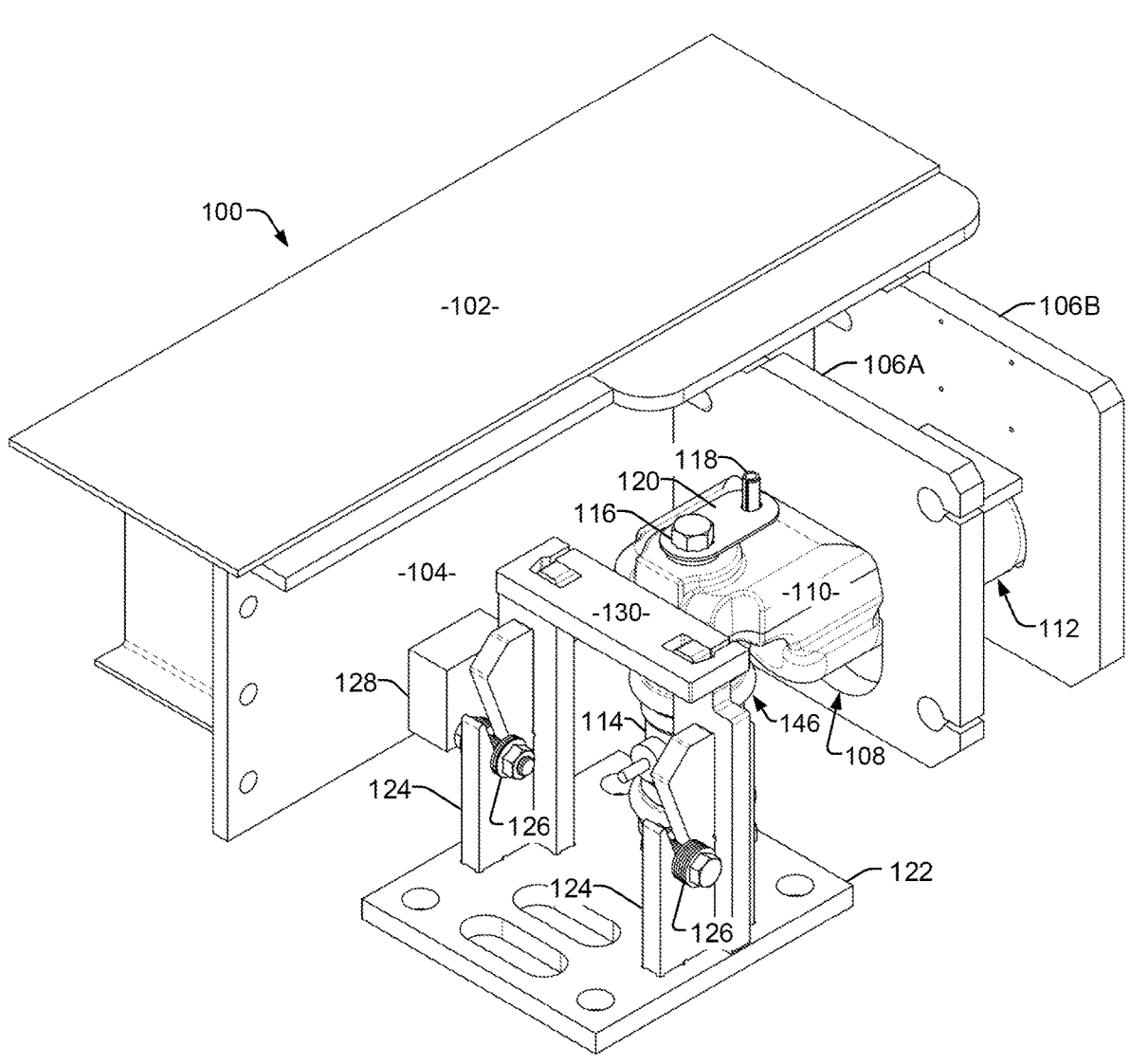
FIG. 1 is a perspective view of an example adapter bar installed in a weigh bridge, in accordance with aspects of this disclosure.

The present disclosure provides systems and methods for an adapter bar for a weigh bridge. The adapter bar includes an adapter extension that is configured to extend into one or more support plates comprising a structure of the weigh bridge. The adapter bar further includes an adjustable mount, which is configured to receive a load cell and adjust a vertical position or elevation of the weigh bridge relative to the load cell. The adjustable mount can include a threaded shaft that is connected to the adjustable mount, the threaded shaft being operable to adjust a vertical position of the weigh bridge relative to a baseplate secured to an underlying surface.

In some examples, an adapter bar is used to replace another type of load cell, to enable the weigh bridge to employ a canister or compression load cell. For example, the adapter bar can be a cast, machined, and/or fabricated part configured to mount to one or more walls, extensions, supports, or other structure of the weigh bridge. This can include a structure that is also designed to receive another type of load cell, such as a bending beam load cell, a shear beam load cell, and/or similar type of load cell.

Bending beam or shear beam load cells are mounted differently from a canister load cell. For example, bending bean and shear beam load cells are normally mounted horizontally (e.g., parallel to an underlying ground surface), whereas canister (e.g., compression) load cells are mounted vertically relative to the ground surface. The adapter bar can be installed in the same or similar location to the bending beam or shear beam load cells, and configured to mount to a canister load cell. Advantageously, this allows for retrofitting of an existing weigh bridge designed for bending or shear beam load cells, and/or provides versatility for installation of a variety of load cells in a weigh bridge.

The adapter bar may include an adjustment mount or device to receive the canister load cell and to change a vertical position of the weigh bridge relative to the ground surface. For example, the adjustment device may include a threaded shaft terminating with a mount or mounting device to support the canister load cell. Once the canister load cell is installed within the mount, the position of the mount can be adjusted, causing a vertical shift in the attached weigh bridge. The adjustment mount can be a cast, machined, and/or fabricated part that provides vertical adjustment by use of a displacement tool, such as a threaded shaft, moving relative to the adapter bar. This is an improvement of conventional adjustment options, such as the use of shims or a "grouting" baseplate.

In some examples, the adjustment device is a formed as a single body, such that the displacement tool and mount are a single piece. In other examples, one or more of the components of the adjustment device are formed separately and assembled to support the adapter bar on the canister load cell.

In some examples, the adapter bar is installed in a weigh bridge and supported via the canister load cell resting on a baseplate secured to the underlying ground surface. To ensure proper alignment between the adapter bar and the baseplate, an installation or column tool can be employed to represent a shape and/or size of the canister load cell. For instance, the column tool is arranged at the baseplate on the foundation so that baseplate is located correctly, relative to the adapter bar and the weigh bridge structure, for "checking" (e.g., stopping transverse and longitudinal movement of) the weigh bridge during a weighing operation, and to vertically align the canister load cell.

Once aligned, the baseplate is fastened to the ground surface. The adjustable device is opened to remove the column tool and to receive the canister load cell. The adjustable device is then adjusted to secure the load cell and support the weigh bridge by the adapter bar.

Once in place, one or more locking devices can be installed and/or arranged on the adapter bar or the adjustment device to ensure the installation is secure. For instance, a locking plate can be added to fix an orientation of the adjustable mount relative to the adapter bar. In some examples, a checking plate is added to fix a position of the adapter bar relative to the baseplate, and/or limit the travel between the weigh bridge and the baseplate.

In disclosed examples, an adapter bar for a weigh bridge includes an adapter extension configured to extend into one or more support plates of the weigh bridge; and an adjustable mount configured to receive a load cell and adjust a vertical position of the weigh bridge relative to the load cell.

In some examples, a threaded shaft connected to the adjustable mount, the threaded shaft configured to adjust a vertical position of the weigh bridge relative to a baseplate. In examples, the threaded shaft is operable to turn relative to the adapter bar to change a vertical position of the adjustable mount. In examples, a locking plate to fix an orientation of the adjustable mount relative to the adapter bar.

In some examples, the adapter bar is dimensioned to fit within an opening of the one or more support plates, the opening dimensioned to support a bending beam load cell, a shear beam load cell, or a weighbar.

In some examples, the load cell is a canister load cell, a column load cell, or a compression load cell.

In some examples, the baseplate includes one or more sidebars configured to support one or more spacers, the one or more spacers adjustable relative to one or more adjacent weigh bridge walls. In examples, a first distance between a first spacer and a first adjacent surface and a second distance between a second spacer and a second adjacent surface are substantially uniform. In examples, the one or more spacers include one or more of a bolt, a fastener, a shim, or a washer. In examples, the one or more sidebars are configured to support a checking plate operable to fix a position of the adapter bar relative to the baseplate.

In some examples, the load cell includes one or more alignment devices to align or fix a position or orientation of the load cell with one or more protrusions arranged on the baseplate.

In some disclosed examples, a method for installing an adapter and canister load cell for a weigh bridge. The method includes inserting an extension of an adapter bar into one or more openings of one or more support plates of the weigh bridge; arranging a baseplate on a surface below an adjustable mount of the adapter bar; aligning the baseplate with the adjustable mount; securing the baseplate to the surface based on a position of the adjustable mount; installing a load cell between the adjustable mount and the baseplate; and adjusting the adjustable mount to secure the load cell between the adjustable mount and the baseplate.

In some examples, the method includes inserting a column tool or the load cell into the adjustable mount. In examples, aligning includes aligning the baseplate with the adjustable mount and one of the load cell or the column tool, and further comprising removing the column tool.

In some examples, installing the load cell includes aligning the load cell with one or more protrusions arranged on the baseplate to fix the position or orientation of the load cell relative to the baseplate.

In some examples, the method includes installing one or more spacers to one or more sidebars of the baseplate, the one or more spacers configured to maintain a threshold distance between the one or more spacers and one or more adjacent surfaces of the weigh bridge.

In some examples, a first distance between a first spacer and a first adjacent surface and a second distance between a second spacer and a second adjacent surface are substantially uniform.

In some examples, the method includes installing one or more locking devices to maintain a position of the adapter bar or the load cell relative to the baseplate.

In some examples, installing the one or more locking devices includes installing a locking plate to fix an orientation of the adjustable mount relative to the adapter bar. In examples, installing the one or more locking devices includes installing a checking plate to fix a position of the adapter bar relative to the baseplate.

When introducing elements of various embodiments described below, the articles "a," "an," and "the" are intended to mean that there are one or more of the elements. The terms "comprising," "including," and "having" are intended to be inclusive and mean that there may be additional elements other than the listed elements. Moreover, while the term "exemplary" May be used herein in connection to certain examples of aspects or embodiments of the presently disclosed subject matter, it will be appreciated that these examples are illustrative in nature and that the term "exemplary" is not used herein to denote any preference or requirement with respect to a disclosed aspect or embodiment. Additionally, it should be understood that references to "one embodiment," "an embodiment," "some embodiments," and the like are not intended to be interpreted as excluding the existence of additional embodiments that also incorporate the disclosed features.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein, the terms "first" and "second" May be used to enumerate different components or elements of the same type, and do not necessarily imply any particular order.

The terms "control circuit," "control circuitry," and/or "controller," as used herein, may include digital and/or analog circuitry, discrete and/or integrated circuitry, micro-processors, digital signal processors (DSPs), and/or other logic circuitry, and/or associated software, hardware, and/or firmware. Control circuits or control circuitry may be located on one or more circuit boards that form part or all of a controller.

In the drawings, similar features are denoted by the same reference signs throughout.

Turning now to the drawings, FIG. 1 illustrates a perspective view of an example adapter bar installed in a weigh bridge system 100, in accordance with aspects of this disclosure. In the example of FIG. 1, the system 100 employs an adapter bar 110 to fit a load cell 114 (e.g., a canister load cell, a column load cell, a compression load cell, etc.) in a weigh bridge 102. As shown, the adapter bar 110 includes an adapter extension 112 configured to extend into one or more openings 108 of one or more support plates 106A and 106B of the weigh bridge 102. In some examples, the openings 108 are dimensioned to receive a variety of load cells (e.g., a bending beam load cell, a shear beam load cell, a weighbar, etc.), and the adapter bar 110 modifies the arrangement between the weigh bridge 102 and the load cell, such that a canister load cell supports the weigh bridge (e.g., on baseplate 122).

An adjustable mount 146 is configured to receive a load cell 114 and adjust a vertical position of the weigh bridge 102 relative to the load cell 114. For example, the vertical position of the adjustable mount 146 can be changed relative to the load cell 114, the baseplate 122, and/or an underlying surface or foundation. As the adjustable mount 146 moves, the weigh bridge 102 moves up or down to ensure the weigh bridge 102 rests on the load cell 114, thereby leveling the weigh bridge relative to the top of the foundation.

Figure 9A:
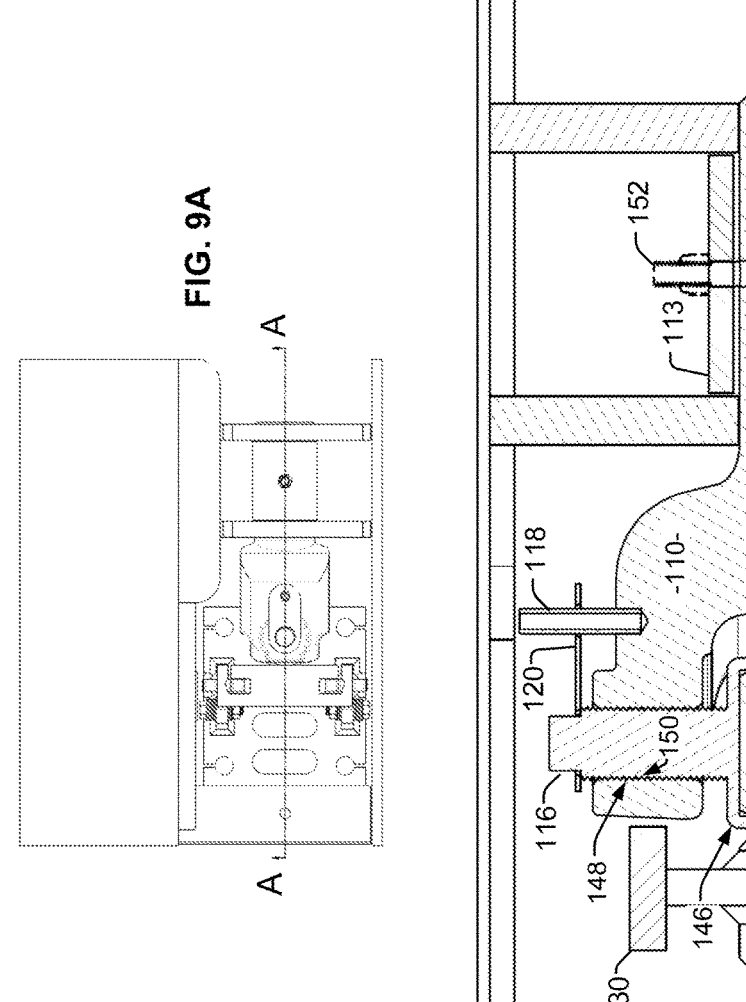
FIG. 9A is an overhead view of the example baseplate and adapter bar, in accordance with aspects of this disclosure.
Figure 9B:
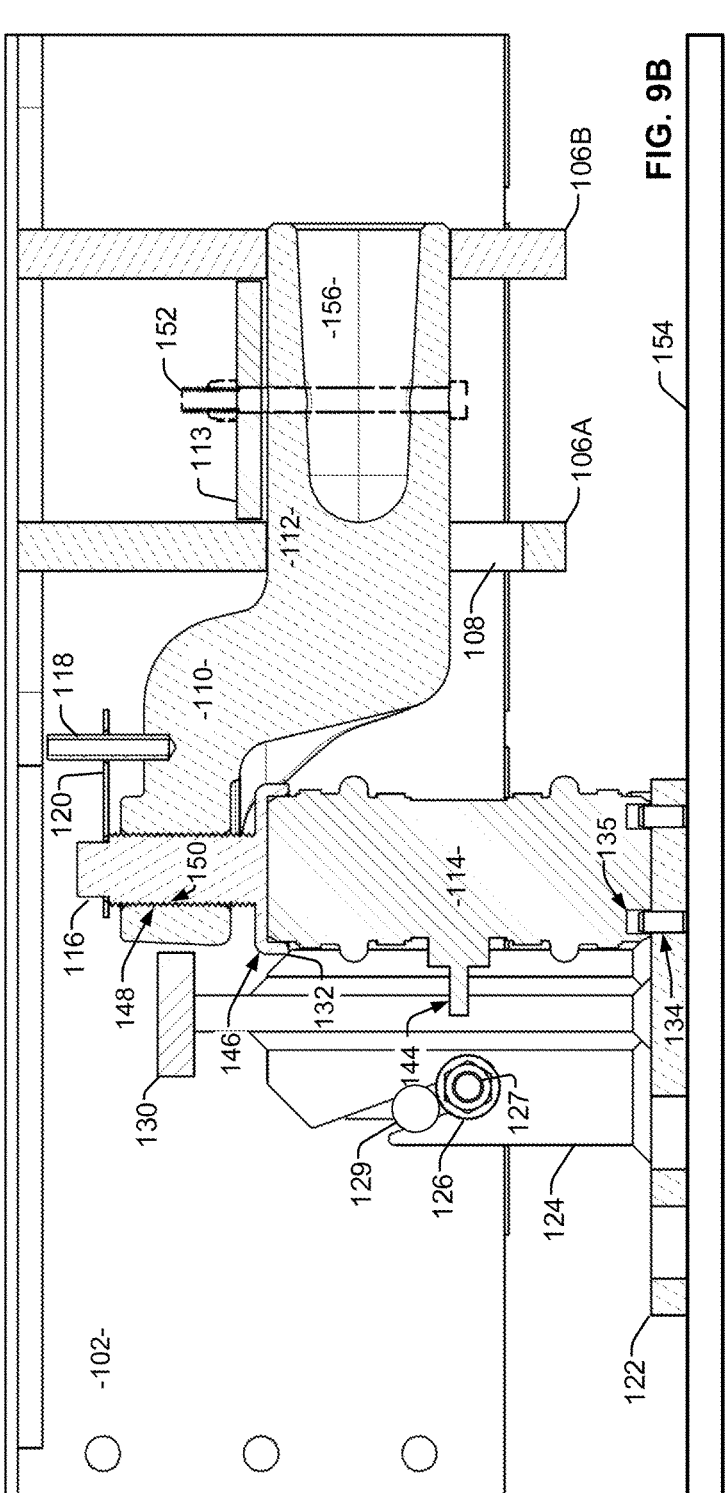
FIG. 9B is a cross-section view of the example baseplate and adapter bar of FIG. 9A, in accordance with aspects of this disclosure.

The vertical position of the adjustable mount 146 is changed by a threaded shaft 116, which can move vertically by rotation of the adjustment device 116 (see, e.g., FIG. 9B). Once the height of the adapter bar 110 is set to a desired level, a locking plate 120 can be placed over the threaded shaft 116 and/or a post 118 (e.g., protruding from a surface of the adapter bar 110) to fix an orientation of the adjustable mount 146 relative to the adapter bar 110.

The baseplate 122 is fastened on the underlying surface and arranged to align with the adjustable mount 146 in a manner to ensure the load cell 114 is in a desired orientation (e.g., substantially vertical). In some examples, the baseplate 122 includes one or more sidebars 124 configured to support one or more spacers 126, configured to be adjustable relative to one or more adjacent weigh bridge walls 104. Although not shown for clarity, another weigh bridge wall may be arranged adjacent the baseplate 122 and the adapter 110, opposite the weigh bridge wall 104 shown in FIG. 1.

In some examples, the sidebars 124 are configured to support a checking plate 130, which serves to fix a position of the adapter bar 110 relative to the baseplate 122. In other words, the baseplate 122 is in a fixed position relative to the underlying surface, and supports the adapter bar 110 and the weigh bridge 102 via the load cell 114. During a weigh operation, forces may cause movement of the weigh bridge 102 (e.g., from a vehicle moving onto or from the weigh bridge). To ensure such movement does not cause the load cell 114 to fall out of alignment, the checking plate 130 prevents excess forward/backward movement of the adapter bar 110. Further, the spacers 126 prevent excess lateral movement, as provided in FIGS. 5 and 6.

The resulting system 100 allows for a canister type load cell to be installed in a weigh bridge that may not be designed for such a load cell. Advantageously, this provides flexibility to the installer as to which type of load cell best suits a particular installation.

Figure 2:
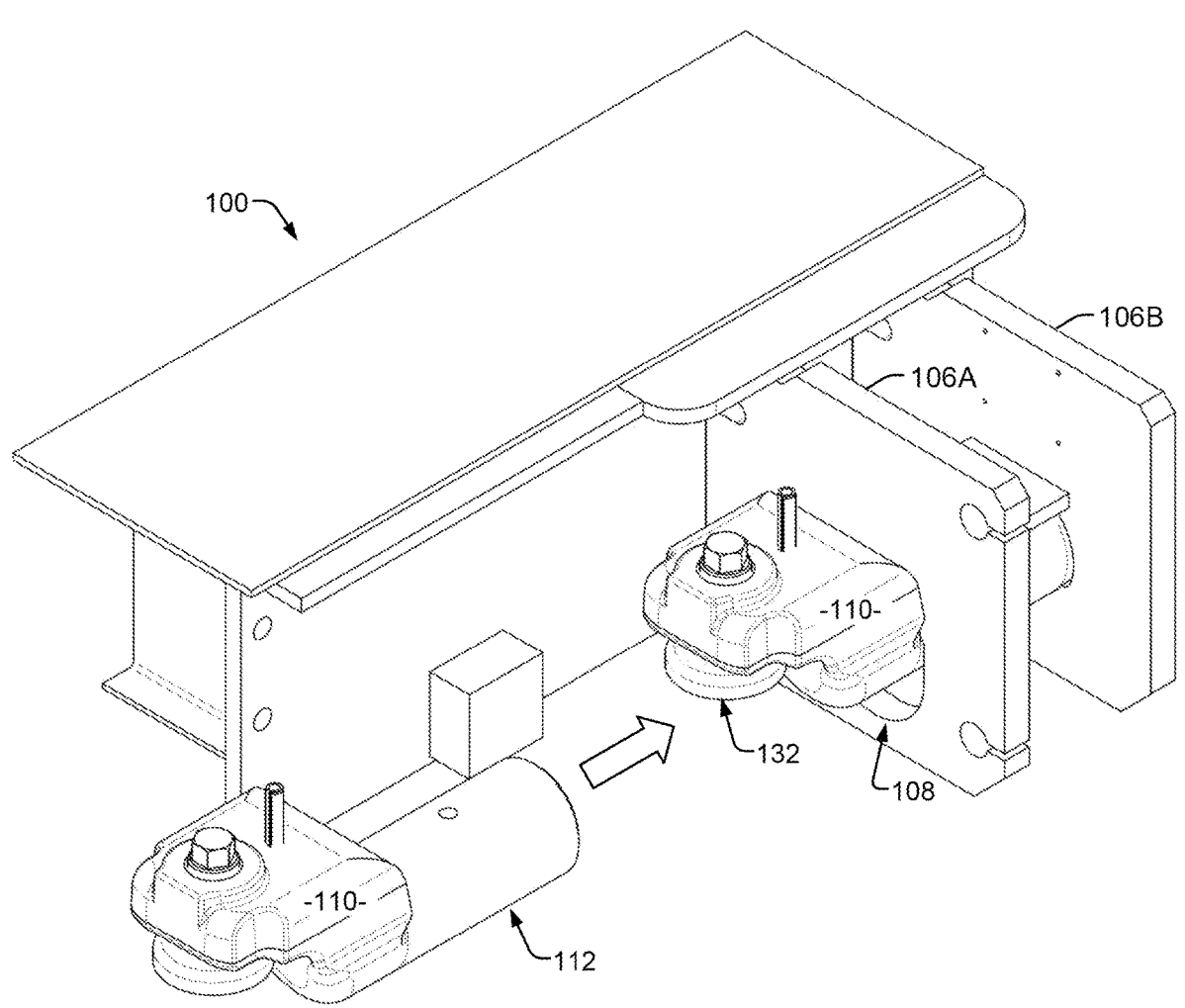
FIG. 2 is a perspective view of the example adapter bar being installed in a weigh bridge, in accordance with aspects of this disclosure.

FIG. 2 illustrates a perspective view of the example adapter bar 110 being installed in the weigh bridge 102. For example, a weigh bridge may be supported by jacks, blocks, pallets, or otherwise raised to allow for installation. Any existing load cell would be removed (e.g., in a retrofit situation), and the extension 112 of the adapter bar 110 would be inserted into the openings 108.

Figure 3:
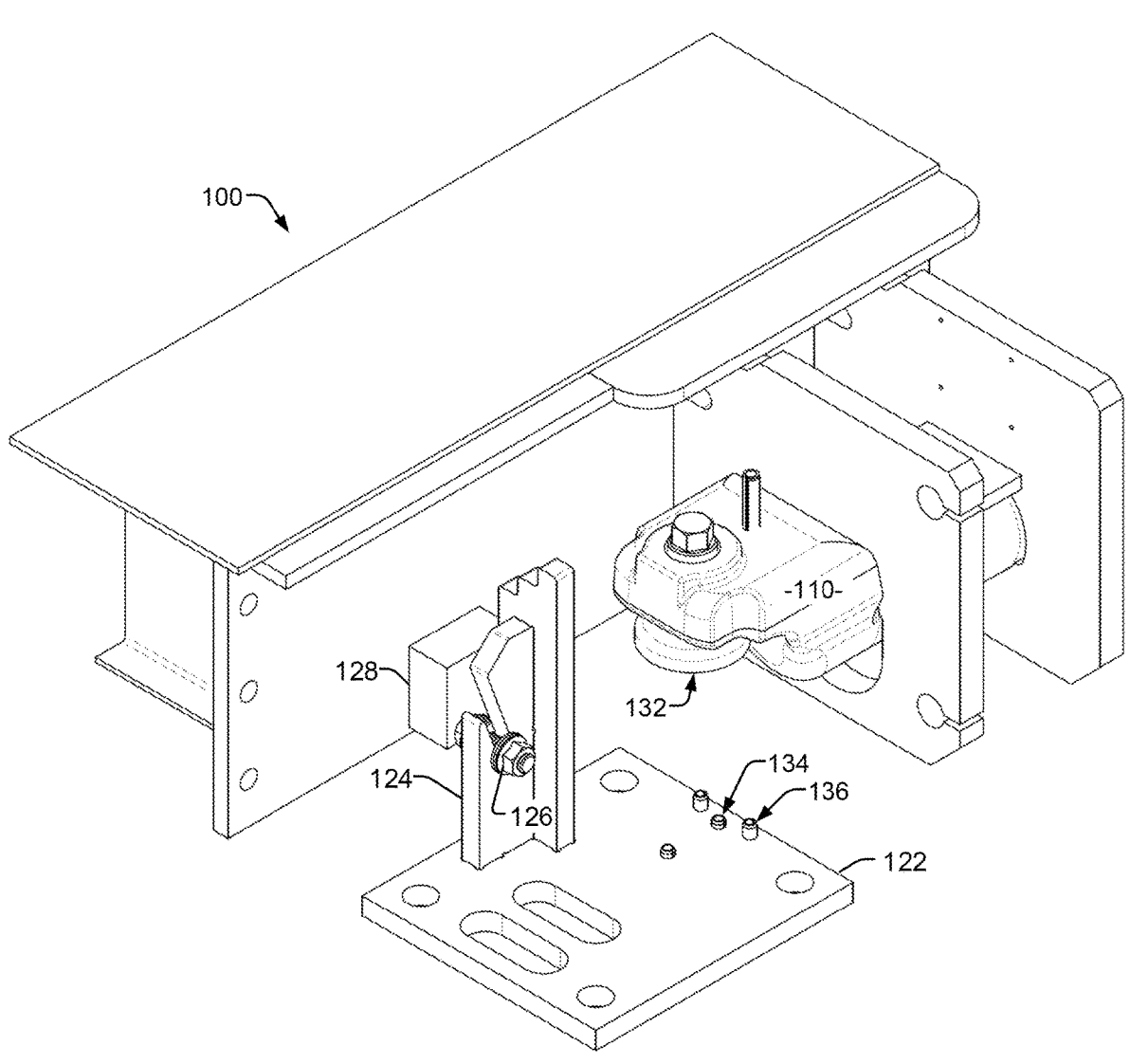
FIG. 3 is a perspective view of an example baseplate for the example adapter bar, in accordance with aspects of this disclosure.

Once the adapter bar 110 is in place, the baseplate 122 is arranged on the underlying surface below the adjustable mount 146, as shown in FIG. 3. For instance, the adjustable mount 146 includes a lip, impression, and/or ring 132 operable to fit a portion of the load cell 114. To facilitate alignment of the load cell 114, one or more protrusions 134, 136 are arranged on the baseplate 122. In some examples, one or more protrusions 134 are arranged to mate with a hole 135 within a corresponding surface of the load cell 114, such that a position or orientation of the load cell 114 is fixed relative to the baseplate 122 once installed (see, e.g., FIG. 9B).

Figure 4:
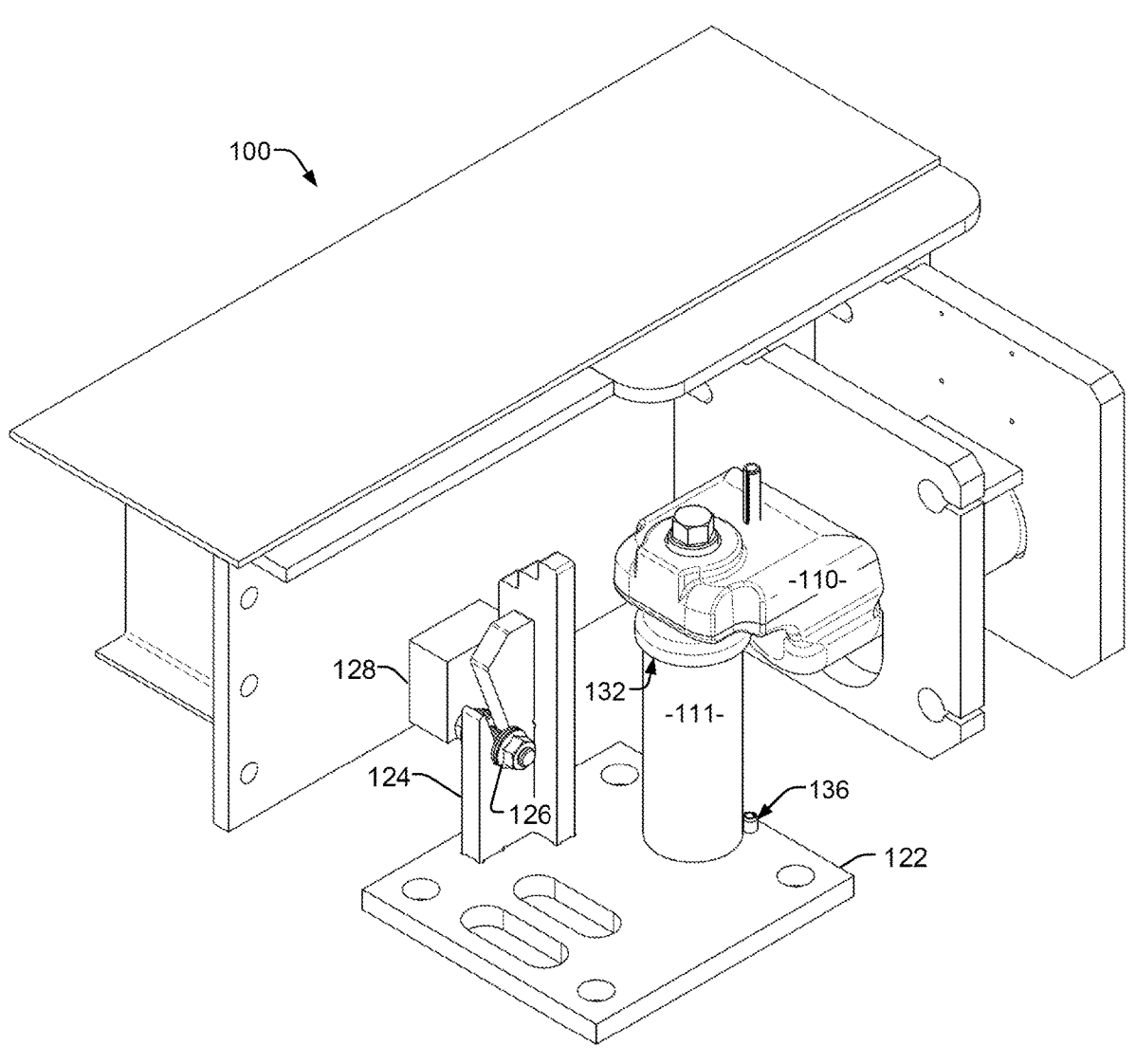
FIG. 4 is a perspective view of an example column tool installed between the baseplate and the adapter bar, in accordance with aspects of this disclosure.

Another set of protrusions 136 may be arranged on the baseplate 122 to aid in alignment of both the load cell 114 and/or the column tool 111, as shown in FIG. 4. As shown, the column tool 111 can be installed between the baseplate 122 and the adapter bar 110. In particular, the column tool 111 is sized and/or shaped to replicate the size and/or shape of the load cell 114. Therefore, the column tool 111 can be inserted into the lip 132 and pressed against the one or more protrusions 136. The column tool 111 aids in alignment and placement of the baseplate 122, which may include use of a level or other tool to ensure the orientation of the column tool 111 corresponds with the desired orientation.

Figure 5:
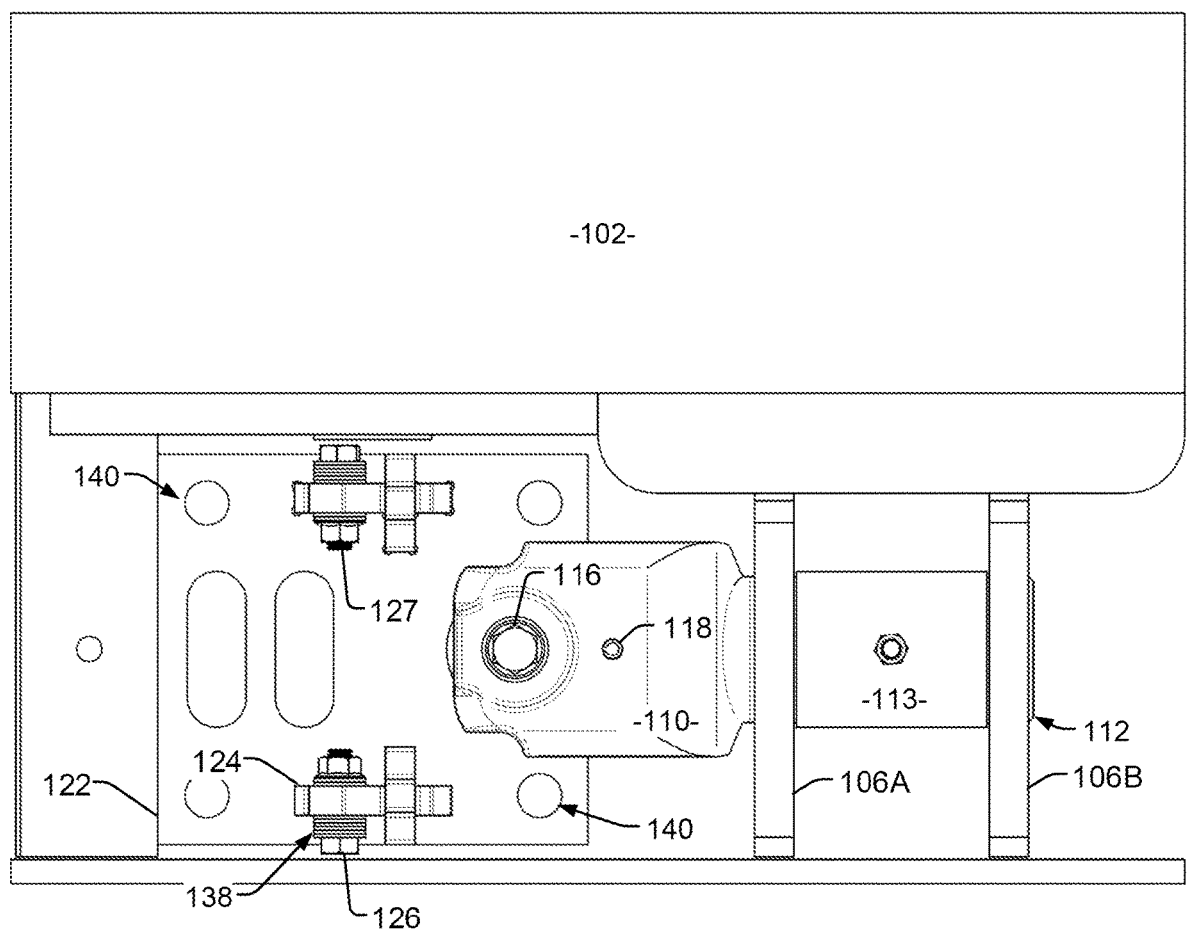
FIG. 5 is an overhead view of the example baseplate and adapter bar, in accordance with aspects of this disclosure.
Figure 6A:
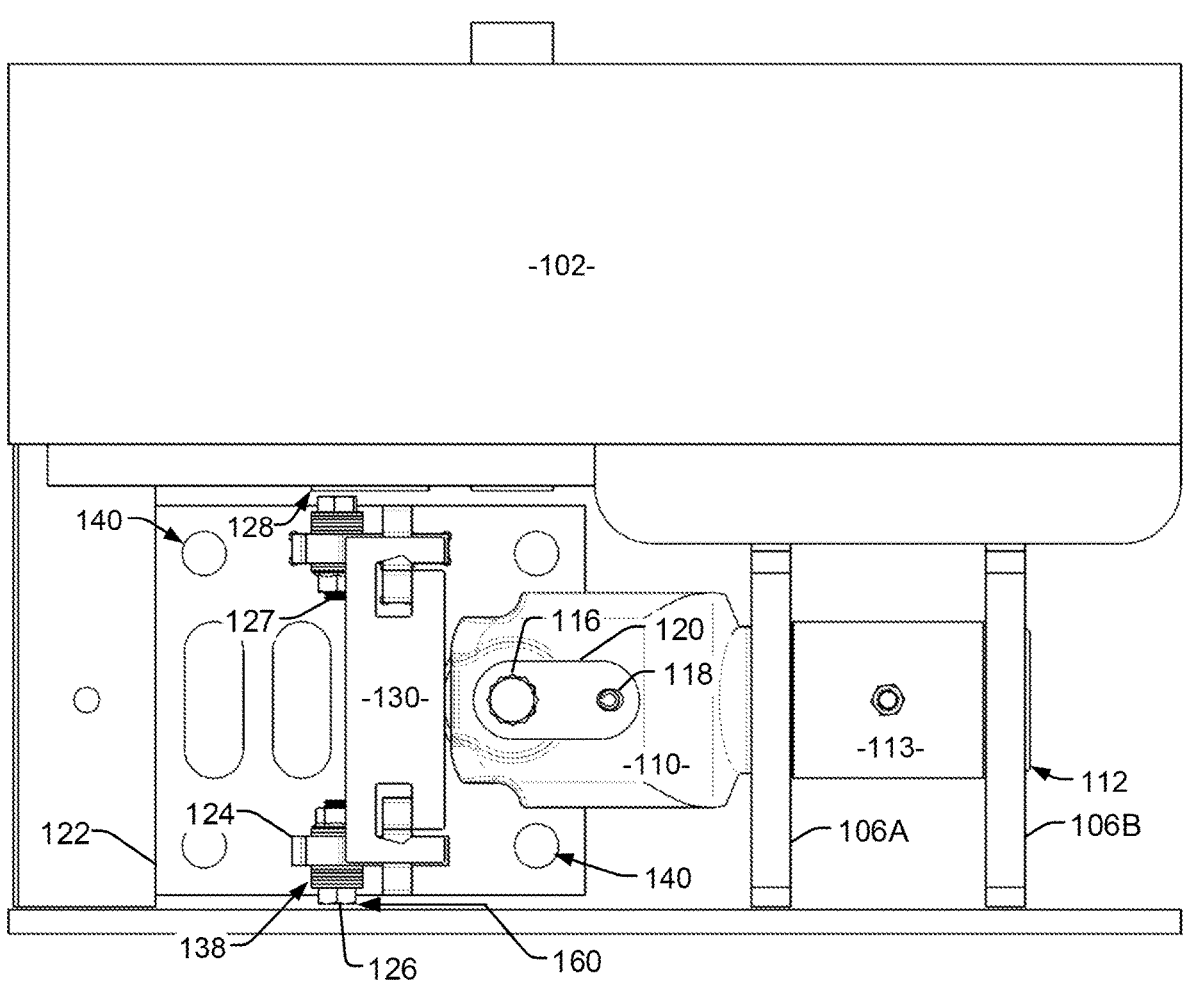
FIG. 6A is an overhead view of the example baseplate and adapter bar secured by one or more locking devices, in accordance with aspects of this disclosure.

As shown in FIG. 5, once properly aligned, one or more fasteners 140 (e.g., bolts, screws, rivets, posts, welds, etc.) are used to secure the baseplate 122 to the underlying surface. The spacers 126 are installed on sidewalls 124 to ensure a desired amount of space or gap between the spacers 126 and the walls of the weigh bridge 102. For example, a gap 160 of a threshold amount can be desirable, such that some lateral movement is tolerated (e.g., due to vibration, movement, expansion due to heat, etc.), as shown in FIG. 6A. However, limiting the amount of play on the weigh bridge 102 is also desirable; therefore, spacing between the spacers 126 and the walls 104 and/or spacing blocks 128 can be adjusted by one or more washers or shims 138, supported by one or more bolts 127.

Figure 6B:
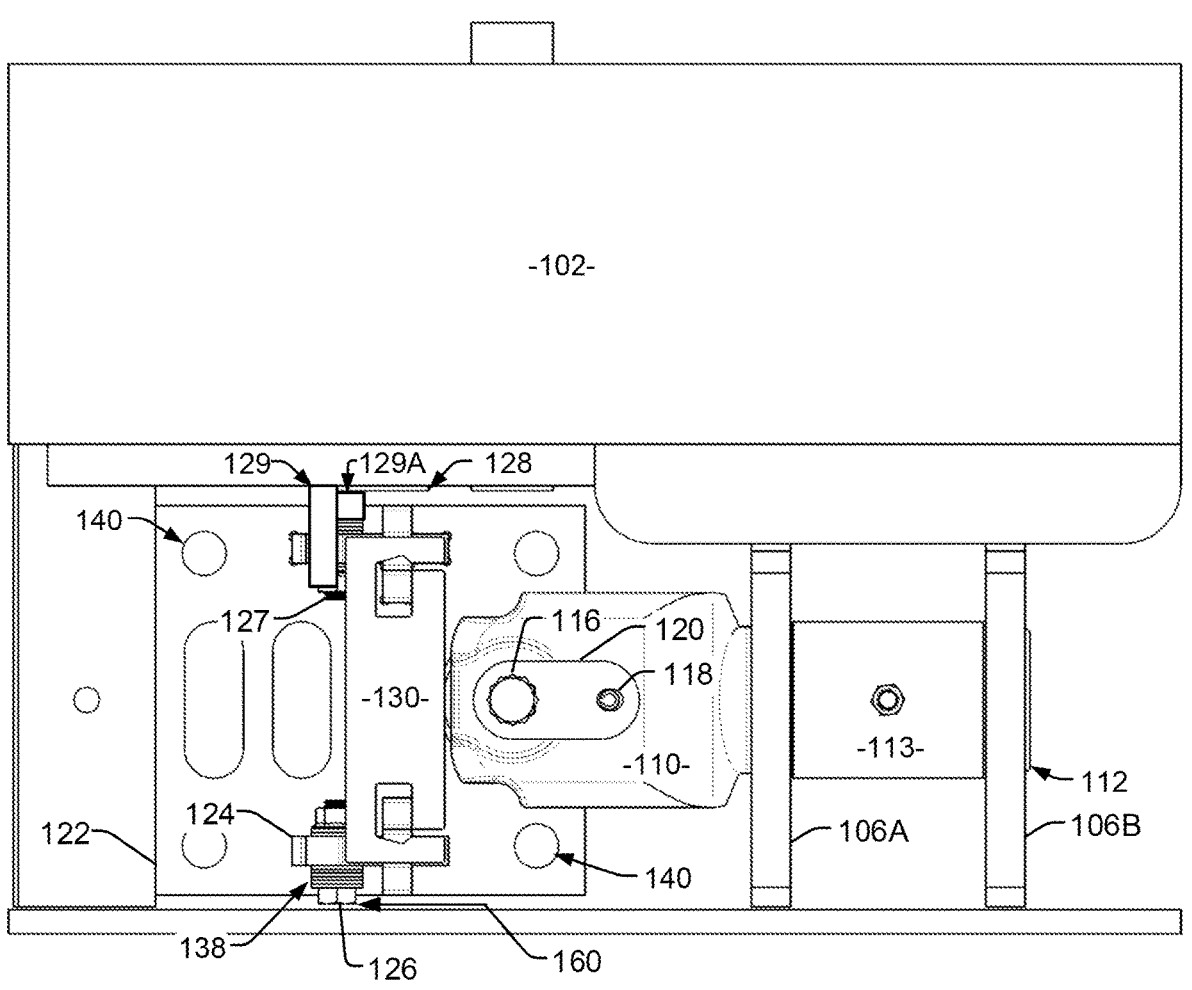
FIG. 6B is an overhead view of another example baseplate and adapter bar, in accordance with aspects of this disclosure.

In some examples, one or more stabilizing dampers can be included to limit movement of the scale relative to the base. For example, the stabilizing damper 129 can be a flexible bolt or rod (e.g., a rubber or rubber encased metallic or plastic bolt) can be added to a sidewall 124 of the base, the damper 129 arranged to extend toward an edge of a wall 102 of the weigh bridge 102, but not necessarily in contact with the wall 102 (e.g., in the absence of a load). As shown in FIG. 6B, the damper 129 is within a slot in the sidewall 124 along with bolt 127 supporting spacers 126 and/or shims 138. Damper 129 (and/or a rubber encasing damper bolt 129) is longer than the bolts 127. Thus, the damper 129 and/or its rubber coating is near but not necessarily in contact with the wall 102 (and/or the spacing blocks 128), but arranged to make contact with the wall 102 before bolt 127 during weigh bridge movement, thereby providing a degree of stability to the weigh bridge During normal use of the weigh bridge, the wall of the weigh bridge will mover relative to the base, and therefore the stabilizing damper will limit the amount of movement at the interface between the wall and the base. As a result, the damper and/or its rubber coating may eventually wear away, however the bolt would remain and may provide a residual stabilizing effect. Once the rubber material wears away, the damper 129 can be replaced to strengthen the stabilizing effect. In some examples, the damper bolt 129 and/or the bolt 127 can be fitted with a cap 129A comprising the rubber or damping material.

In some examples, the spacers 126 may have a bumper (e.g., a flexible material, such as rubber) on an end bumping against the weigh bridge. This allows for ease of installation, such that the installer can visualize the amount of distance between surfaces, while ensuring contact between the surfaces is within the desired threshold amount. In some examples, the gap 160 on both sides of the baseplate 122 is substantially equal, as uneven movement, even over small distances, may impact a weigh operation. In other examples, one side will be defined with a first distance (e.g., between a first spacer and a first adjacent wall or weigh bridge surface), and another side will be defined by a second distance (e.g., between a second spacer and a second adjacent wall or weigh bride surface).

Figure 7:
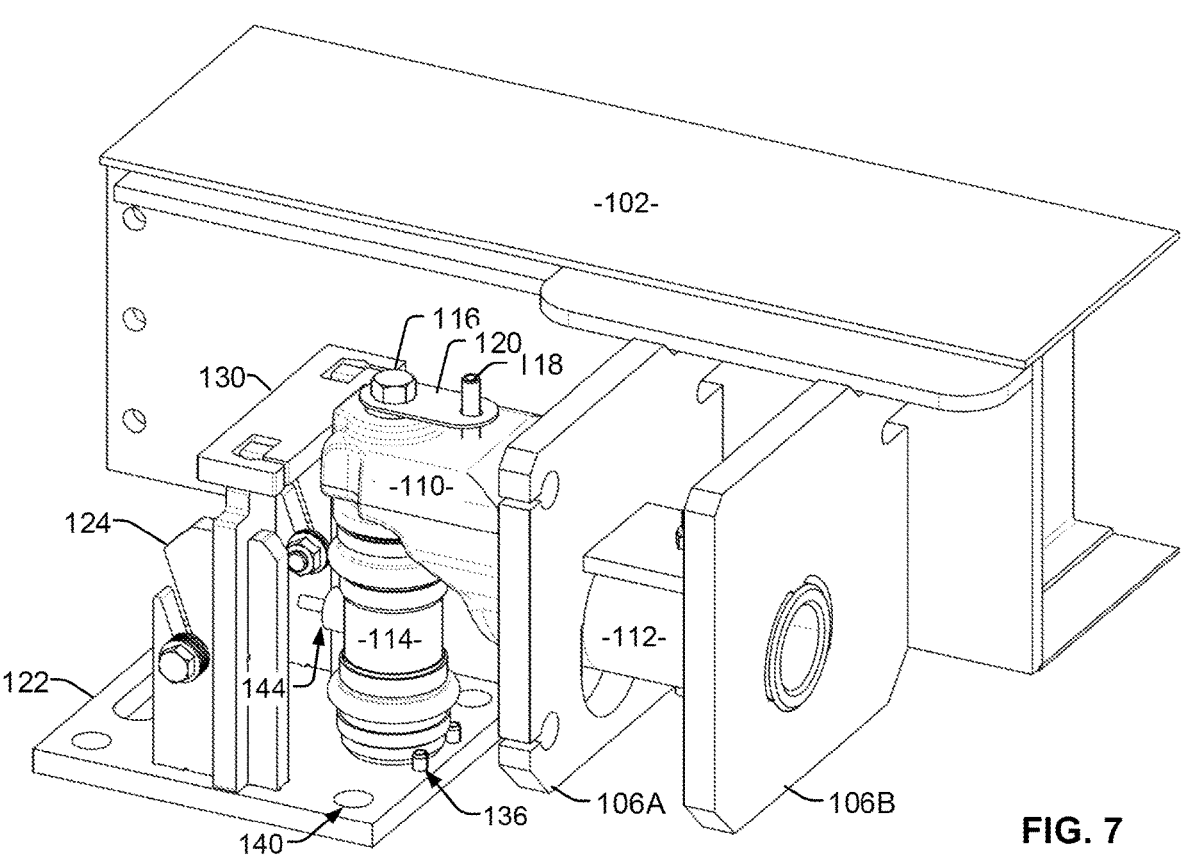
FIG. 7 is another perspective view of the example adapter bar installed in the weigh bridge, in accordance with aspects of this disclosure.

FIG. 7 is another perspective view of the example adapter bar 110 after installation in the weigh bridge 102. As shown, the protrusions 136 serve to support the load cell 114 and ensure movement of the weigh bridge 102 does not cause movement of the load cell 114. Although illustrated as cylindrical pins, in some examples, the protrusions 136 can have additional or alternative geometric features, such as a wall, triangles, or other suitable shapes, in a variety of sizes. In some examples, the protrusions 136 are fixed with respect to the baseplate 122. In other examples, the protrusions 136 may be removed, such as after installation is complete.

Figure 8:
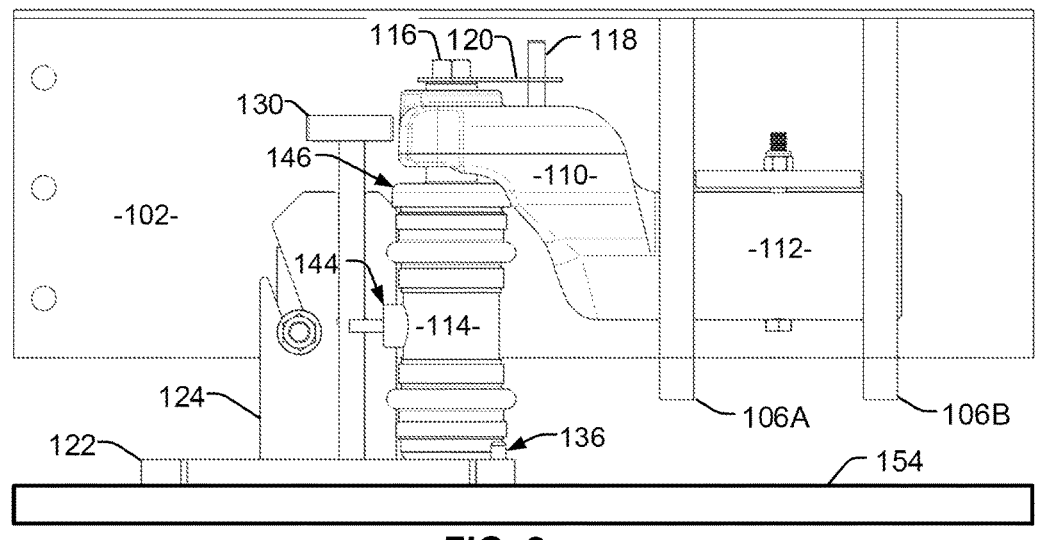
FIG. 8 is a side view of the example baseplate and adapter bar installed in the weigh bridge, in accordance with aspects of this disclosure.

FIG. 8 illustrates a side view of the baseplate 122 and adapter bar 110 installed in the weigh bridge 102 supported by an underlying surface 154 (e.g., a foundation, ground, etc.). In operation, measurements from the load cell 114 are transmitted to a controller (e.g., a computing platform, a remote computer, a cloud network, etc.), with signals containing the measurement data transmitted via carrier 144 (e.g., a wired or wireless transmitter).

FIG. 9B is a cross-section view along line A-A of the example baseplate and adapter bar of FIG. 9A. In the illustrated example, the adjustable mount 146 is a single structure that includes the threaded shaft 116 and the cup 132. The threaded shaft 116 includes external threads 150 that mate with threads 148 in a channel within the adapter bar 110. Thus, rotation of the adjustable mount 146 causes vertical adjustment of the vertical position of the mount and the load cell 114, and ultimately the weigh bridge 102.

Although illustrated as a single piece in FIG. 9B, in some examples the adjustable mount 146 could be formed of multiple parts, such that the threaded shaft 116 is a bolt connected to the cup 132, with the threaded shaft being capable of rotating with or independent of the cup 132.

Holes 135 are formed in a surface of the load cell 114 to mate with protrusions 134, as shown. In some examples, the arrangement of holes and protrusions is reversed, such that the load cell includes protrusions and the holes are located on the baseplate 122. In some examples, no holes or protrusions are present, and one or more alignment techniques and/or devices are used to ensure the baseplate 122 is properly oriented with the adapter bar 110.

The extension 112 may include an opening 156, which remain unfilled or filled with one or more materials. In some examples, the extension 112 is a solid member. As shown, a brace 113 extends between the support plates 106A and 106B, and a fastener 152 extends through the brace 113 and the extension 112 to fix the orientation and position of the adapter bar 110 relative to the support plates 106A and 106B.

Figure 10:
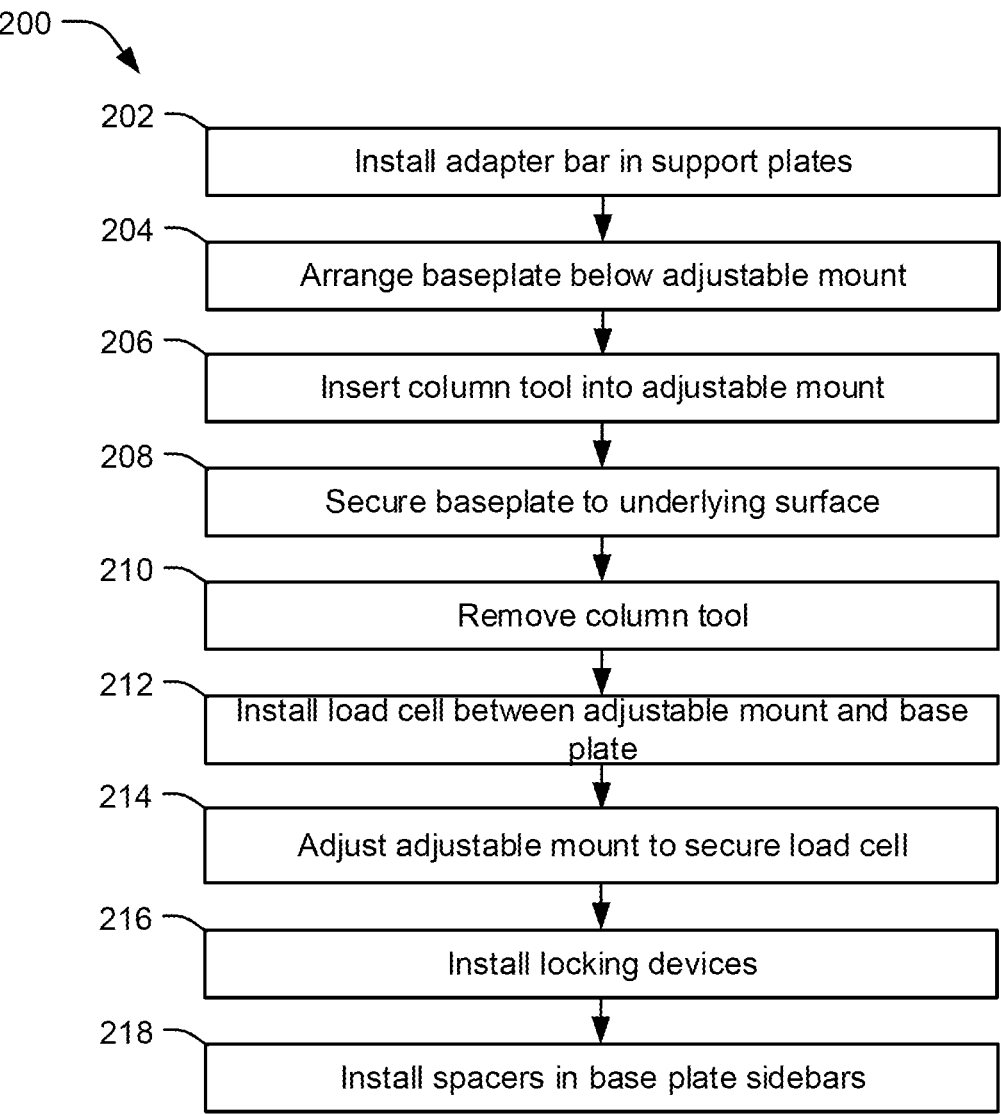
FIG. 10 is a method of installing an adapter bar into a weigh bridge employing a column tool, in accordance with aspects of this disclosure.

FIG. 10 is a method 200 of installing an adapter bar into a weigh bridge employing a column tool, in accordance with aspects of this disclosure. In block 202, an extension 112 of an adapter bar 110 is installed into one or more openings 108 of one or more support plates 106 of the weigh bridge 102. In block 204, a baseplate 122 is arranged on a surface below an adjustable mount 146 of the adapter bar. In block 206, a column tool 111 or the load cell is inserted into the adjustable mount. In block 206, the baseplate is aligned with the adjustable mount, the load cell, and/or the column tool. In block 208, the baseplate is secured to the surface based on a position of the adjustable mount, the load cell, and/or the column tool. In block 210, the column tool is removed (e.g., if the optional column tool was used in block 206).

In block 212, a load cell 110 is installed between the adjustable mount and the baseplate (if not already done in block 206). In some examples, installing the load cell includes aligning the load cell with one or more protrusions 136 arranged on the baseplate to fix the position or orientation of the load cell relative to the baseplate.

In block 214, the adjustable mount is adjusted to secure the load cell between the adjustable mount and the baseplate. In block 216, one or more locking devices 120/130 are installed to maintain a position of the adapter bar or the load cell relative to the baseplate.

In some examples, installing the locking mechanism includes one or both of installing a locking plate 120 to fix an orientation of the adjustable mount relative to the adapter bar, or installing a checking plate 130 to fix a position of the adapter bar relative to the baseplate.

In some examples, the method further includes installing one or more spacers 126 to one or more sidebars of the baseplate, the one or more spacers configured to maintain a threshold distance between the one or more spacers and one or more adjacent surfaces of the weigh bridge, in block 218. For example, a first distance between a first spacer and a first adjacent surface and a second distance between a second spacer and a second adjacent surface are substantially uniform.

Figure 11:
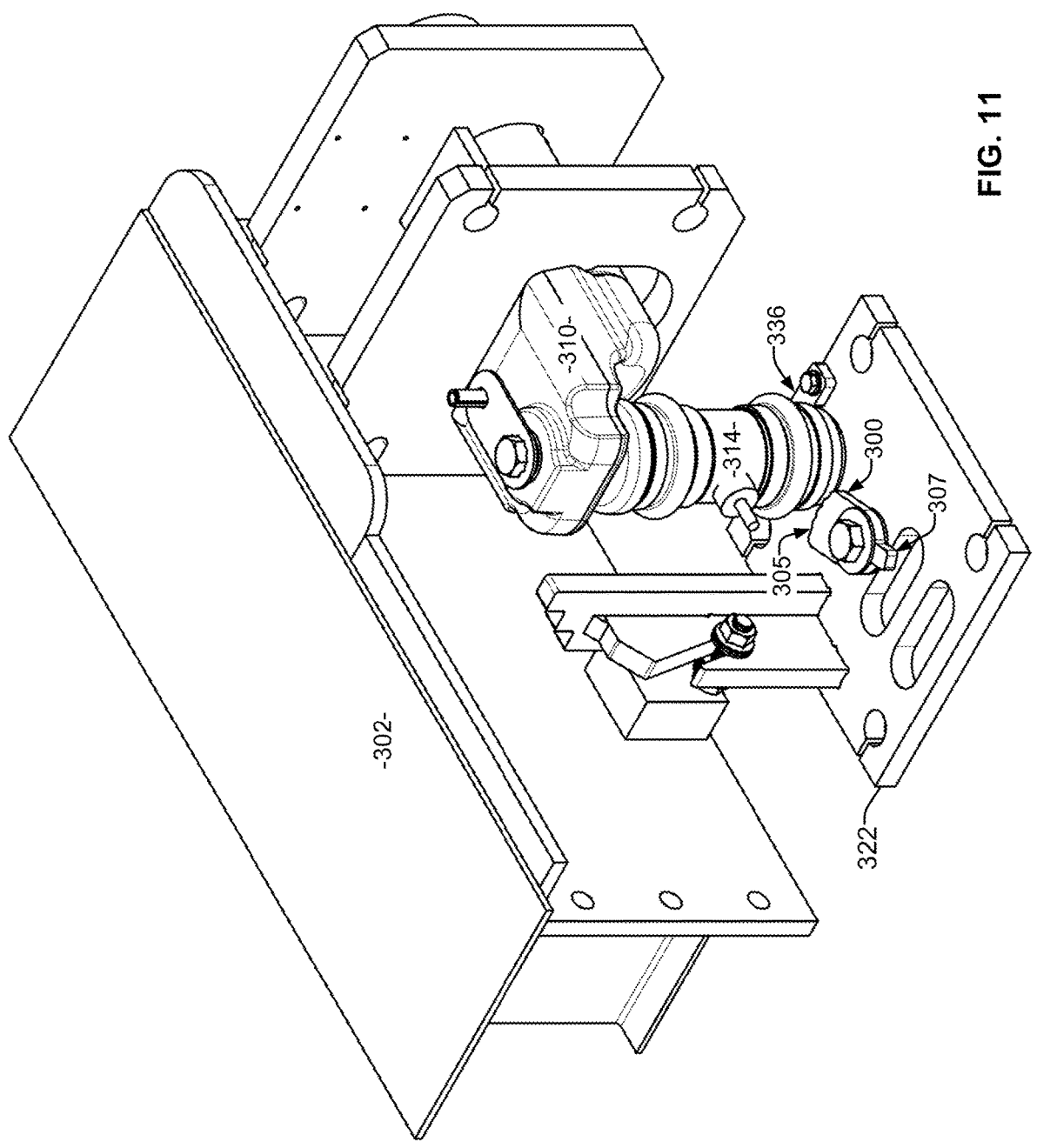
FIG. 11 is a perspective view of another example adapter bar installed in a weigh bridge, in accordance with aspects of this disclosure.

Although several examples are provided with locking devices, such as a locking plate and/or checking plate, some examples employ alternative lock features, as shown in FIG. 11. For instance, a cam-lock feature 300 can be provided. The cam-lock 300 can be fastened to the baseplate 322, and can be adjusted to ensure a desired amount of force between the load cell 314 and a load support 336 (e.g., protrusions, bar, or other type of support). For example, the cam-lock 300 may include a number of surfaces 305 to interface with a sidewall of the load cell 314, such that rotation and/or placement of the cam-lock 300 can be changed to secure the load cell 314 on the baseplate 322. Maintenance of the load cell with the cam-lock prevents rotation from vibrations and/or movement of the weigh bridge 302.

The cam-lock 300 may include one or more devices 307 (e.g., protrusion, extension, etc.) to receive a tool (e.g., a wrench, pliers, bar, etc.—not shown) to change a position of the cam-lock 300. For example, the device 307 is on the cam-lock 300 opposite the surfaces 305 allowing for a tool to apply torque to the cam-lock 300. This torque forces the surfaces 305 against the load cell 314, thereby securing the load cell 314 against the load support 336.

The present method and/or system may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

What is claimed is:

1. An adapter bar for a weigh bridge comprising:
an adapter extension configured to extend into one or more support plates of the weigh bridge; and
an adjustable mount configured to receive a load cell and adjust a vertical position of the weigh bridge relative to the load cell.

2. The adapter bar of claim 1, further comprising a threaded shaft connected to the adjustable mount, the threaded shaft configured to adjust a vertical position of the weigh bridge relative to a baseplate.

3. The adapter bar of claim 2, wherein the threaded shaft is operable to turn relative to the adapter bar to change a vertical position of the adjustable mount.

4. The adapter bar of claim 3, further comprising a locking plate to fix an orientation of the adjustable mount relative to the adapter bar.

5. The adapter bar of claim 1, wherein the adapter bar is dimensioned to fit within an opening of the one or more support plates, the opening dimensioned to support a bending beam load cell, a shear beam load cell, or a weighbar.

6. The adapter bar of claim 1, wherein the load cell is a canister load cell, a column load cell, or a compression load cell.

7. The adapter bar of claim 1, wherein the baseplate includes one or more sidebars configured to support one or more spacers, the one or more spacers adjustable relative to one or more adjacent weigh bridge walls.

8. The adapter bar of claim 7, wherein a first distance between a first spacer and a first adjacent surface and a second distance between a second spacer and a second adjacent surface are substantially uniform.

9. The adapter bar of claim 7, wherein the one or more spacers include one or more of a bolt, a fastener, a shim, or a washer.

10. The adapter bar of claim 7, wherein the one or more sidebars are configured to support a checking plate operable to fix a position of the adapter bar relative to the baseplate.

11. The adapter bar of claim 1, wherein the load cell includes one or more alignment devices to align or fix a position or orientation of the load cell with one or more protrusions arranged on the baseplate.

12. A method for installing an adapter and canister load cell for a weigh bridge, the method comprising:
inserting an extension of an adapter bar into one or more openings of one or more support plates of the weigh bridge;
arranging a baseplate on a surface below an adjustable mount of the adapter bar;
aligning the baseplate with the adjustable mount;
securing the baseplate to the surface based on a position of the adjustable mount;
installing a load cell between the adjustable mount and the baseplate; and
adjusting the adjustable mount to secure the load cell between the adjustable mount and the baseplate.

13. The method of claim 12, further comprising inserting a column tool or the load cell into the adjustable mount.

14. The method of claim 13, wherein aligning includes aligning the baseplate with the adjustable mount and one of the load cell or the column tool, and further comprising removing the column tool.

15. The method of claim 12, wherein installing the load cell includes aligning the load cell with one or more protrusions arranged on the baseplate to fix the position or orientation of the load cell relative to the baseplate.

16. The method of claim 12, further comprising installing one or more spacers to one or more sidebars of the baseplate, the one or more spacers configured to maintain a threshold distance between the one or more spacers and one or more adjacent surfaces of the weigh bridge.

17. The method of claim 12, wherein a first distance between a first spacer and a first adjacent surface and a second distance between a second spacer and a second adjacent surface are substantially uniform.

18. The method of claim 12, further comprising installing one or more locking devices to maintain a position of the adapter bar or the load cell relative to the baseplate.

19. The method of claim 18, wherein installing the one or more locking devices includes installing a locking plate to fix an orientation of the adjustable mount relative to the adapter bar.

20. The method of claim 18, wherein installing the one or more locking devices includes installing a checking plate to fix a position of the adapter bar relative to the baseplate.

5

* * * * *